United States Patent [19]
Wilcox et al.

[11] Patent Number: 5,826,421
[45] Date of Patent: Oct. 27, 1998

[54] FOAM STRING MOP HEAD

[75] Inventors: Raymond K. Wilcox, Granbury; Geno J. Guglielmi, Grand Prairie, both of Tex.

[73] Assignee: GSP Products, Inc., Dallas, Tex.

[21] Appl. No.: 837,121

[22] Filed: Apr. 14, 1997

Related U.S. Application Data

[60] Provisional application No. 60/020,044, Jun. 19, 1996.
[51] Int. Cl.⁶ .................................................. D02G 3/02
[52] U.S. Cl. ............................. 57/210; 57/907; 87/5; 87/6; 87/9; 87/13
[58] Field of Search ............................. 66/9 R, 9 A, 202, 66/28; 57/210, 225, 907; 87/5, 6, 9, 13

[56] References Cited

U.S. PATENT DOCUMENTS

| | | | |
|---|---|---|---|
| 1,566,544 | 12/1925 | Krebs | 15/229.1 |
| 1,977,948 | 10/1934 | McNamara | 15/229 |
| 2,409,660 | 10/1946 | Briggs | 57/153 |
| 2,600,143 | 6/1952 | Vaughn | 124/53.6 |
| 2,796,622 | 6/1957 | Kalinowski | 15/229 |
| 3,321,903 | 5/1967 | Tanzer | 57/140 |
| 3,578,763 | 5/1971 | Platuo | 87/6 |
| 4,995,133 | 2/1991 | Newell | 15/229.1 |
| 5,225,262 | 7/1993 | Leduc | 87/6 |
| 5,694,755 | 12/1997 | Froystad | 57/210 |

*Primary Examiner*—William Stryjewski
*Attorney, Agent, or Firm*—Geoffrey A. Mantooth

[57] ABSTRACT

A mop head has a fitting, a coupler, and string. The fitting couples to the end of a handle. The coupler attaches the string to the fitting. The string is arranged in multiple loops that depend from the fitting. The string itself is made of a foam core and a protective filament covering. The foam is of the open cell type for absorbency and wringability. The filament is braided or knitted so as to completely encircle the core and to provide openings therethrough in order to allow access to the core. The covering protects the core from tearing and other mechanical damage, while maintaining the porosity of the overall string.

12 Claims, 3 Drawing Sheets

SECTION B-B

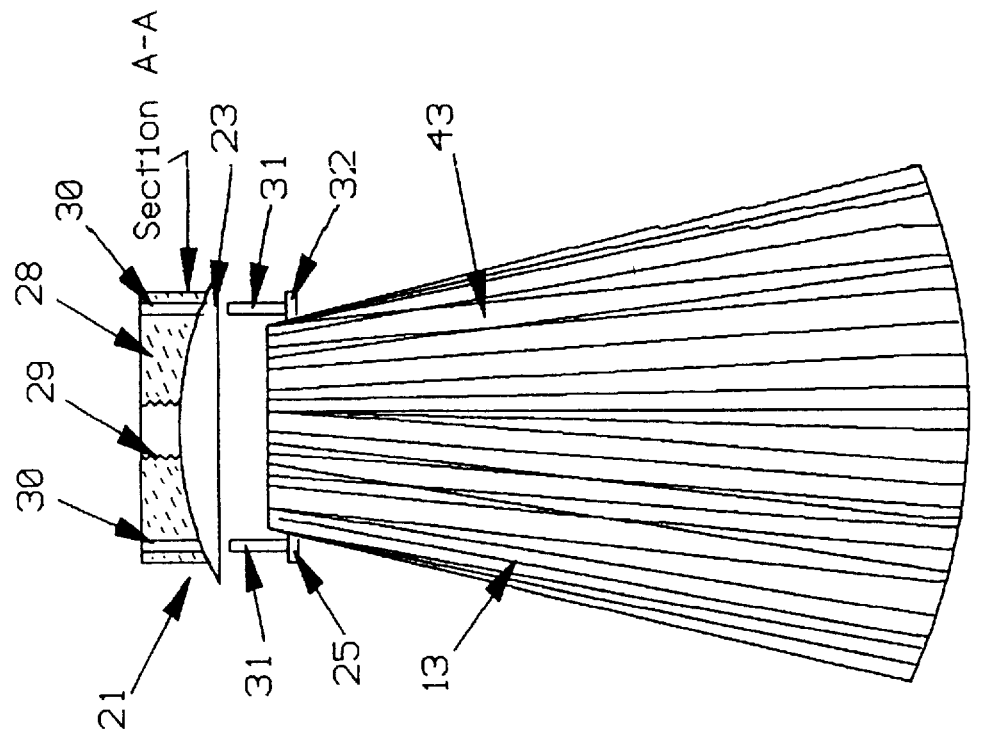
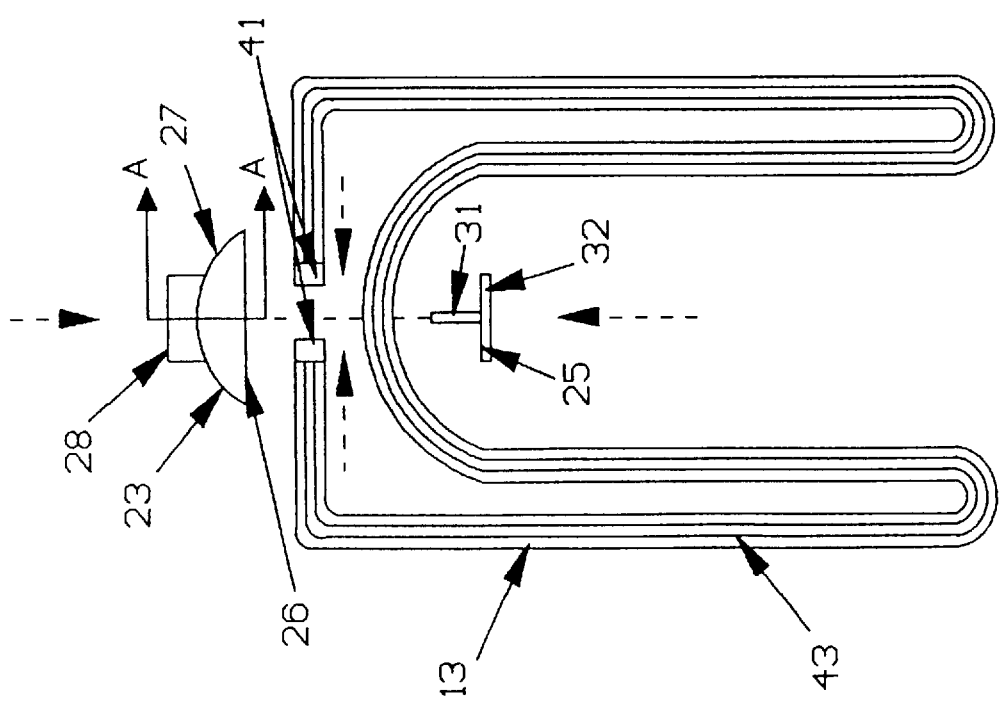

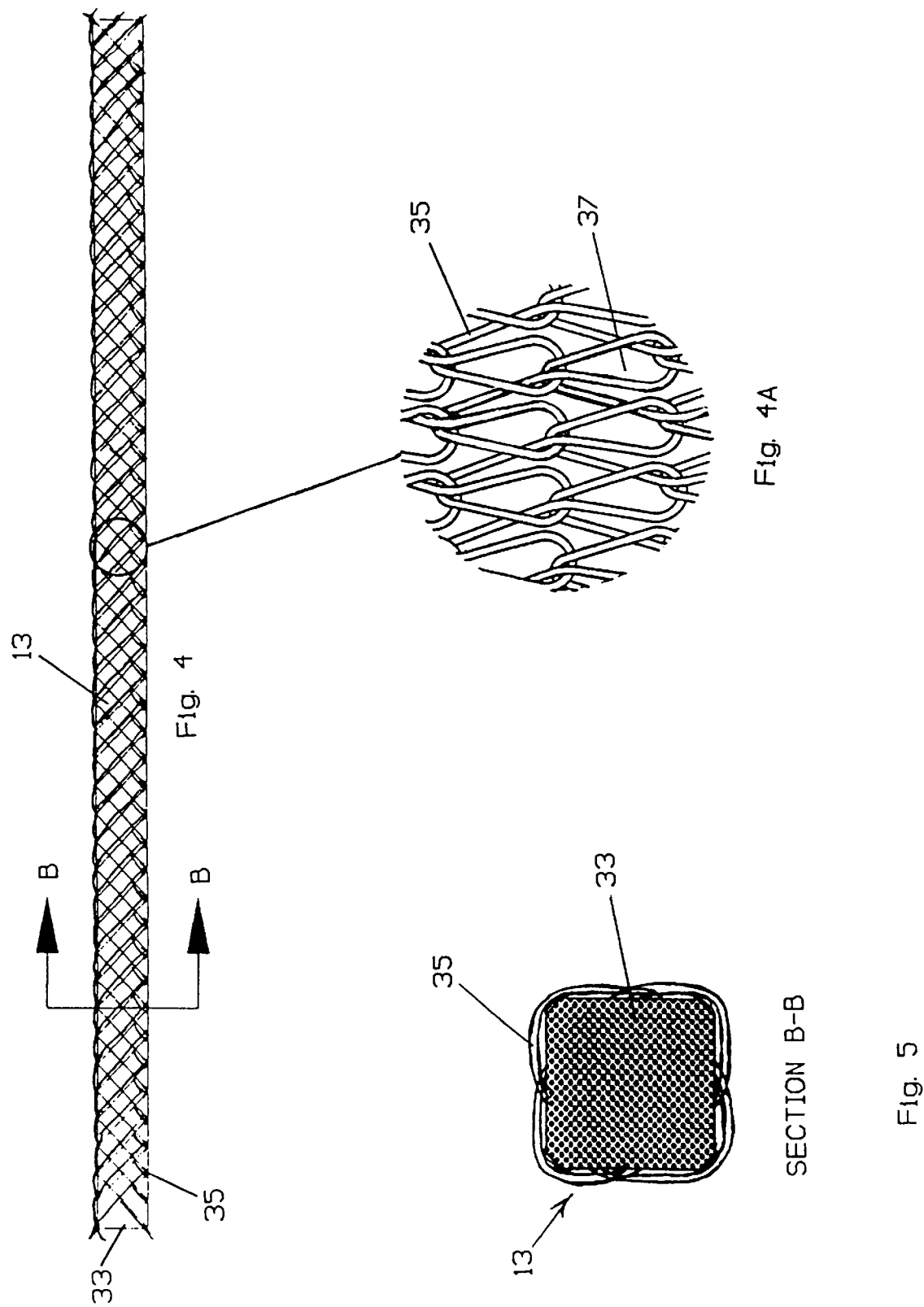

FOAM STRING MOP HEAD

This application claims the benefit of U.S. Provisional application No. 60/020,044, filed Jun. 19, 1996.

FIELD OF THE INVENTION

The present invention relates to absorbent strings and their applications in mop heads.

BACKGROUND OF THE INVENTION

Mops are used to clean floors. A mop has a handle and a mop head attached to one end of the handle. The mop head is made up of multiple absorbent strings tied or coupled together.

In use, the mop head is immersed into a bucket of wash water. The wash water includes water, detergent, and often bleach. After immersing the mop head in the wash water the mop head is raised out of the wash water and wrung. Wringing can be by hand or by a wringing mechanism.

Mop heads are typically made up of either cotton strings or foam strings. Several factors are used to determine the effectiveness of a particular mop head design. These factors include cost, absorbency, ease of wringing out, quickness in drying, strength (resistance to tearing), mildew resistance, and chemical resistance to cleaning detergents.

Cotton string (yarn) mops are inexpensive and absorbent. Unfortunately, cotton string mops are heavy and hard to wring out. In addition, the cotton is very slow in drying and is very susceptible to mildew. In order to improve resistance to mildew, yarn manufacturers have added rayon, polyester, and/or acrylic to the cotton. However, rayon is expensive and low in absorbency, while polyester and acrylic are both very nonabsorbent. Furthermore, none of these additives improve the wringability of the cotton string. Cotton has good resistance to ordinary detergents, but not to bleach. Rayon, polyester, and acrylic have good chemical resistance. The strength and tearing resistance of cotton, rayon, polyester, and acrylic is very good. In fact, these yarns tend to unravel and fray before they tear or break.

Foam mops are made up of strips of either foam or chamois. These materials, which have been developed specifically for mopping and cleaning, are more expensive than cotton. However, the strip materials are light in weight and are easily compressible. Consequently, a foam strip mop is much easier to wring than a cotton mop. In addition, these strip materials are more mildew resistant and are faster drying than are cotton mops.

Unfortunately, the foam strip materials are susceptible to tearing. For example, the strips can become snagged on cabinet comers and furniture feet during mopping. In order to improve the tear strength of the strip materials, they are laminated to nonwoven absorbent cloth. The cloth typically covers one or both sides of the foam strip, thereby interfering with the absorbency of the foam. Another technique to improve the tear strength of foam is providing an interior layer made of the strengthening material. The outer layers are the absorbent material. These outer foam layers are susceptible to partial tearing. Wringing of the strip materials is difficult because of the flat thin geometry. This is because the strips are not easily grouped into a bundle for wringing by twisting. These materials have good resistance to ordinary detergents, but poor resistance to bleach.

SUMMARY OF THE INVENTION

It is an object of the present invention to provide a string material for use in mopping, which material is inexpensive, absorbent, easy to wring, quick drying, tear resistant, mildew resistant, and/or chemical resistant.

The present invention provides a string that includes an elongated core made of solid foam. The foam is of the open cell type. The core has a length. There is also a covering that encircles the core from the length of the core. The covering is formed from a filament that has openings therethrough so as to allow access to the core from an environment surrounding the string. The core is capable of being stretched in the direction of its length until the core breaks. The filament covering is capable of being stretched in the direction of the core length. However, the filament covering limits the amount of stretch of the core so as to prevent the core from breaking.

The present invention also provides a mop head that includes a handle fitting, a length of string, and a coupler. The handle fitting is structured and arranged to be coupled to a handle. The length of string is cut and is arranged in multiple loops. The string includes an elongated core made of solid foam. The foam is of the open cell type. The string has a protective covering located around the core. The covering comprises an open knit filament braid. The coupler attaches the loop string arrangement to the handle fitting.

In accordance with one aspect of the present invention, the foam is made of a material that is selected from the group consisting of polyurethane, polyvinyl alcohol, cellulose sponge and natural sponge.

In accordance with another aspect of the present invention, the foam has a density of 1–8 pounds per cubic foot. The core has a diameter of ⅛ inches–½ inches.

In accordance with another aspect of the present invention, the core has a cross-section that is transverse to its length in the shape of a polygon. This polygon can be, for example, rectangular or square shaped.

In accordance with still another aspect of the present invention, the filament comprises a cotton count of 1.5 to 36. In addition, the filament comprises a blend of cotton and synthetic fiber.

In accordance with another aspect of the present invention, the filament covering can be a knit braid, a jersey knit, a warp knit, a braid, or a crochet knit.

BRIEF DESCRIPTION OF THE DRAWINGS

FIG. 3 is a schematic exploded end view of the mop head.

FIG. 3A is an exploded side view of the mop head, shown in partial cross-section, taken along lines A—A of FIG. 3.

FIG. 4 is a schematic view of a segment of a string, as used in the mop of FIG. 1.

FIG. 4A is a schematic close up view of the filament covering.

FIG. 5 is a schematic transverse cross-sectional view of the string, taken along lines B—B of FIG. 4.

DESCRIPTION OF THE PREFERRED EMBODIMENT

Figure 1:
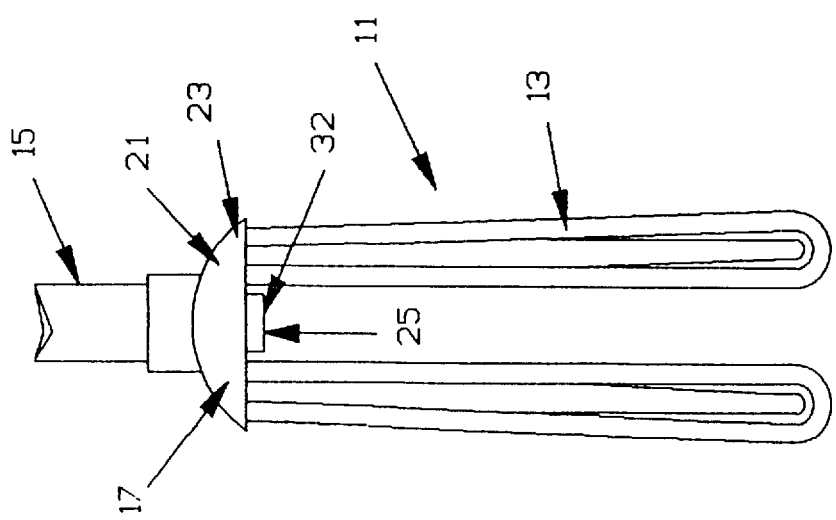
FIG. 1 is a schematic end view of a mop of the present invention, in accordance with a preferred embodiment.

FIG. 1 shows a mop 11 of the present invention in accordance with a preferred embodiment. The mop is of course useful for cleaning floors and the like.

The mop 11 of the present invention uses a string 13 that is low in cost, yet durable. The string is absorbent and easy to wring out, thereby making the mop easy to use.

The mop 11 includes a handle 15 and a mop head 17. The mop handle 15 is typically made of wood, although other materials can be used. One end of the handle is threaded to allow coupling to the mop head 17.

The mop head 17 has a fitting 21 and multiple loops of string 13.

Referring to FIGS. 3 and 3A, the fitting 21, which is conventional and commercially available, has a cup 23 and a clamp 25. The cup 23 is bowl shaped (shown in an inverted position in FIGS. 3 and 3A). On the inside 26 of the cup 23 are a plurality of projections (no shown). The projections assist in gripping the string 13, thereby preventing the string from pulling out of the fitting 21. On the outside 27 of the cup 23 is a coupling portion 28. The coupling portion 28 has a threaded hole 29 therein for receiving the threaded end of the handle 15. Two small bores 30 are provided for receiving the clamp 25. The clamp 25 is generally "U" shaped, having two projections 31 that are received by the bores 30. A cross-piece 32 extends between the two projections. The projections 31 have a barbed structure (not shown), which cooperates with a lip (not shown) inside of the bores 30 so as to provide a one-way locking mechanism. The projections 31 can be easily pushed into the bores; removal of the projections from the bores is difficult.

The string 13 will be discussed next. The string includes a core 33 and a covering 35 around the core.

The core 33 is elongated or string shaped. The core is made of a foam of the open cell type. The foam is solid, as opposed to being a liquid foam. The type of foam used can be the same type foam used in air filters. Air filter type foam lends itself to capturing dirt and is easily cleaned. In addition, this type of foam has a minimum density that restricts air flow. Furthermore, open cell type foams are highly absorbent. In addition, open cell foams are easily compressible to enable wringing of wash water from the foam.

In general, the foam can be made of polyurethane (polyester or polyether), polyvinyl alcohol (PVA), cellulose sponge, or natural sponge. The density of the foam is 1–8 pounds per cubic foot.

The foam core 33 is cut from sheets into strings. Consequently, the transverse cross-section of the foam core is polygonal and preferably rectangular (see FIG. 5). The size of the foam core ranges from ⅛ of an inch on each side to ½ of an inch each side.

While the foam core is highly absorbent and easily compressible, it is also easy to tear. Stretching the core, or pulling on small portions of the core, causes tearing. Such tearing reduces the effective life of the mop head 17.

In order to protect the core, the covering 35 is provided around the core (see FIGS. 4 and 5). The covering is made from an open braid or knit of filament. The filament extends circumferentially around the core, but does not completely cover it. The openings 37 in the filament covering 35 provide porosity to and from the core. The filament covering around the core can be a braid, a knit braid, a jersey knit, a warp knit, or a crochet knit. The filament covering allows the core to be highly exposed to the environment surrounding the string (such as wash water), while at the same time protecting the core from tearing.

The string 13 can be stretched along its length. In the absence of the filament covering 35, the foam core 33 would, when stretched, reach a breaking point and tear. However, the filament covering limits the stretch of the string so that the foam core is unable to reach its breaking point. In addition, the covering protects the foam from being stretched in circumferential and radial directions to the point of breakage. Furthermore, the covering protects the foam from mechanical damage such as nicking.

The filament itself can be made of 100% cotton, 100% rayon, or a blend that includes cotton, rayon, polyester, and/or acrylic. The size of the filament is 1.5–36 cotton count. The filament can have 1–12 plies.

Other types of foams and filaments may be found to be suitable for use in the invention. The foam and filament can be colored for aesthetic purposes.

We have found the following to perform satisfactorily. The foam is polyester of 2 pounds per cubic foot density. The core 33 is square in transverse cross-section, having dimensions of ¼ inch on each side. The filament is a cotton/rayon/polyester blend, having ⅓ cotton, ⅓ rayon, and ⅓ polyester in a 4/1 strand (4 cotton count and 1 ply). The filament is knit braided around the core. The core is passed through a knit braider having a ½ inch diameter head with a ⅜ inch diameter through hole. The knit braider uses 4 needles to feed the filament and creates 4 openings around the circumference of the core.

To make the mop head 17, the string 13 is cut into original lengths (for example, each original length is 30 inches). In the preferred embodiment, there are 48 original lengths. Each length has two ends 41 (see FIG. 3). The two ends 41 are brought together so as to form a loop that is half the length of the original string length. Then, the loop is doubled over so as to form a double loop arrangement 43, shown in FIG. 3, with the length of each loop being ¼ of the length of the original string length.

Figure 2:
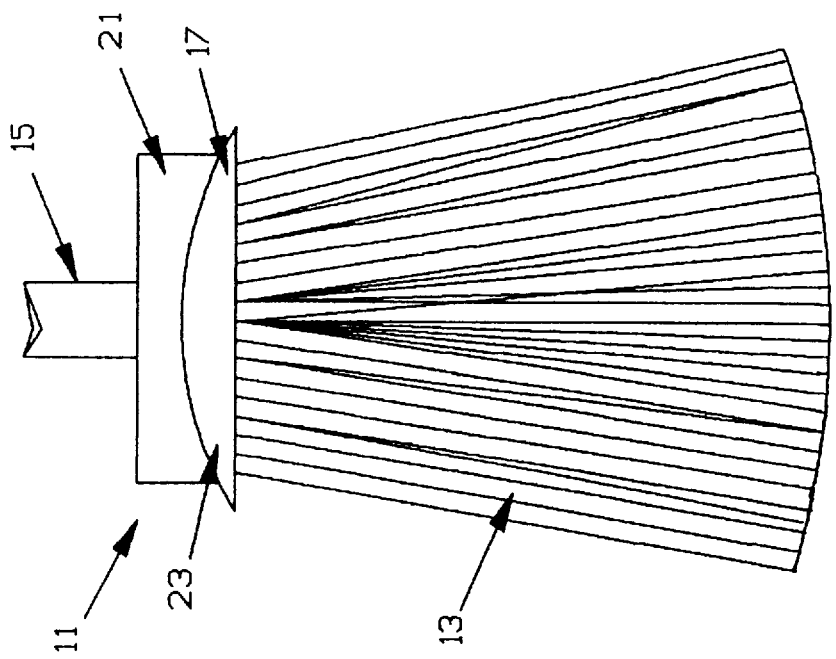
FIG. 2 is a schematic side view of the mop of the present invention.

Multiple loop arrangements 43 are made. Then, these multiple loop arrangements are coupled to the fitting 21. Specifically, the loop arrangments 43 are laid across the cross-piece 32 of the clamp 25, with the ends 41 of the string positioned so as to be interposed between the cup and the clamp (see FIGS. 3 and 3A). Then, the clamp 25 is coupled to the cup 23 by forcing the projections 31 into the bores 30. The clamp 25 is forced as far as possible towards the cup 23. The projections are locked in the bores as discussed above. The ends 41 of the string 13 are thus clamped against the cup. The loops of string 13 hang from the fitting 21 as shown in FIGS. 1 and 2.

The mop head 17 is now complete. To use, the handle is attached to the fitting. The mop is used in the traditional manner for mopping.

After the mop has been used, the mop head 17 may be dirty. An easy way to clean the mop head is to detach the mop head from the handle. The mop head is then washed in a conventional washing machine (such as is commonly used for washing textiles such as clothes). After washing, the mop head can be wrung and hung to dry. The string dries quickly due to its high porosity. Because the string dries quickly, it is mildew resistant.

A mop head utilizing the string of the present invention enjoys many advantages over the prior art. The string is more absorbent and easier to wring by hand. The mop head is also light in weight, thereby reducing the chances of straining the back of the operator. The materials are low in cost. The string is durable because the foam is protected by the open, stretchable filament covering. The open filament covering allows for maximum absorbency and increased strength.

The foregoing disclosure and showings made in the drawings are merely illustrative of the principles of this invention and are not to be interpreted in a limiting sense.

We claim:

1. A string, comprising:
   a) an elongated core made of solid foam, the foam being of the open cell type and being absorbent, the core having a length;
   b) a porous covering encircling the core for the length of the core, the covering being formed from at least one filament, the covering having openings therethrough so as to allow access to the core from an environment around the string with portions of the core being exposed to the environment around the string by way of the openings;
   c) the string being capable of being stretched in the direction of the length of the core, with the covering having a greater breaking strength than the core.

2. The string of claim 1 wherein the foam is made of a material selected from the group consisting of polyurethane, polyvinyl alcohol, cellulose sponge, and natural sponge.

3. The string of claim 1 wherein the foam has a density of 1–8 pounds per cubic foot.

4. The string of claim 1 wherein the core has a diameter of ⅛ inch–½ inch.

5. The string of claim 1 wherein the core has a cross-section transverse to its length in the shape of a polygon.

6. The string of claim 1 wherein the core has a cross-section transverse to its length in the shape of a rectangle.

7. The string of claim 1 wherein the filament comprises a cotton count of 1.5 to 36.

8. The string of claim 1 wherein the filament comprises a blend of cotton and synthetic fibers.

9. The string of claim 1 wherein the covering is selected from the group consisting of knit braid, jersey knit, warp knit, braid, and crochet knit.

10. The string of claim 1 wherein the string forms multiple loops.

11. The string material of claim 1 wherein:
    a) the foam is made of a material selected from the group consisting of polyurethane, polyvinyl alcohol, cellulose sponge, and natural sponge;
    b) the foam has a density of 1–8 pounds per cubic foot;
    c) the core has a diameter of ⅛ inch–½ inch;
    d) the core has a cross-section transverse to its length in the shape of a polygon;
    e) the filament comprises a cotton count of 1.5–36;
    f) the filament comprises a blend of cotton and synthetic fibers;
    g) the covering is selected from the group consisting of knit braid, jersey knit, warp knit, braid, and crochet knit;
    h) the string forms multiple loops.

12. The string material of claim 1 wherein the cover openings are larger than a diameter of the filament.

* * * * *